April 19, 1960   F. E. DAVIS ET AL   2,933,306
APPARATUS FOR FEEDING SINTERING MACHINE
Filed Sept. 10, 1956

INVENTORS:
FLOYD E. DAVIS and
BRONNIE F. KRANE,
BY: Donald G. Dalton
their Attorney.

United States Patent Office 2,933,306
Patented Apr. 19, 1960

2,933,306

APPARATUS FOR FEEDING SINTERING MACHINE

Floyd E. Davis, Gary, and Bronnie F. Krane, Hammond, Ind.

Application September 10, 1956, Serial No. 609,003

2 Claims. (Cl. 266—21)

This invention relates to an improved apparatus and method for feeding material to sintering machines.

An object of the invention is to provide an improved apparatus and method which feed a porous and uniform layer of material to a traveling grate sintering machine.

A further object is to provide an improved apparatus and method for feeding material to a traveling grate sintering machine wherein the material is fluffed before deposition on the grate and the depth of bed on the grate is uniformly and positively controlled.

A more specific object is to provide an improved apparatus and method for feeding material to a traveling grate sintering machine in which feed material discharges from a hopper to a chute in carefully controlled volumes, and is subjected to fluffing action in the chute immediately preceding deposition on the grate, whereby the resulting sinter bed is uniform in depth and highly porous.

Figure 1:
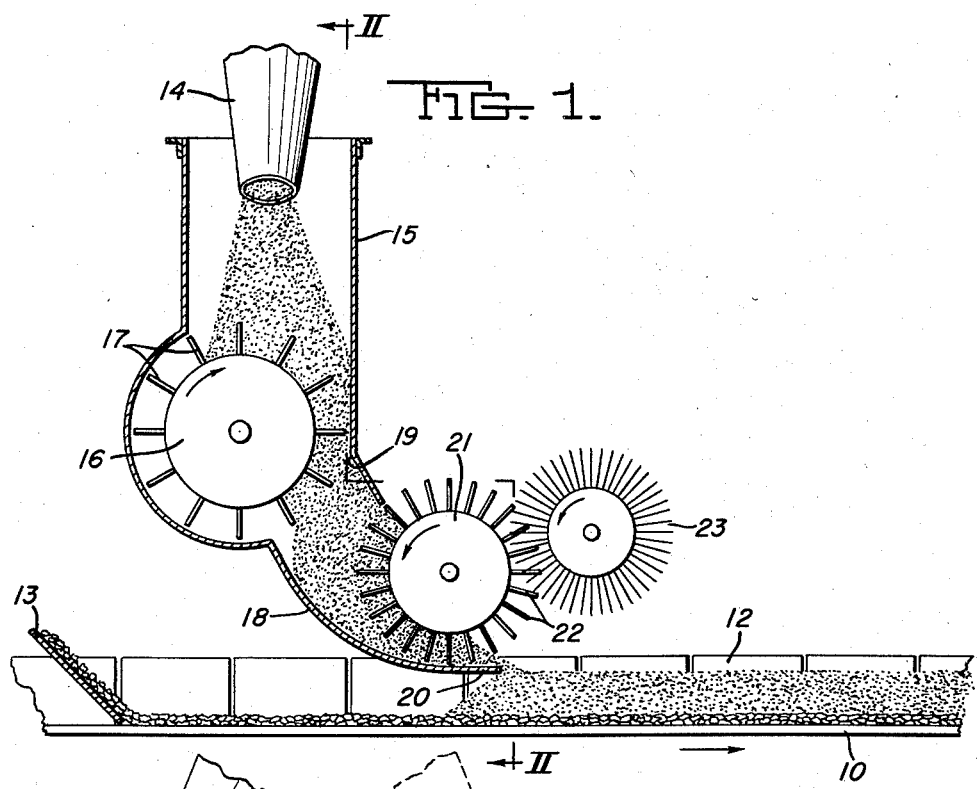
Figure 2:
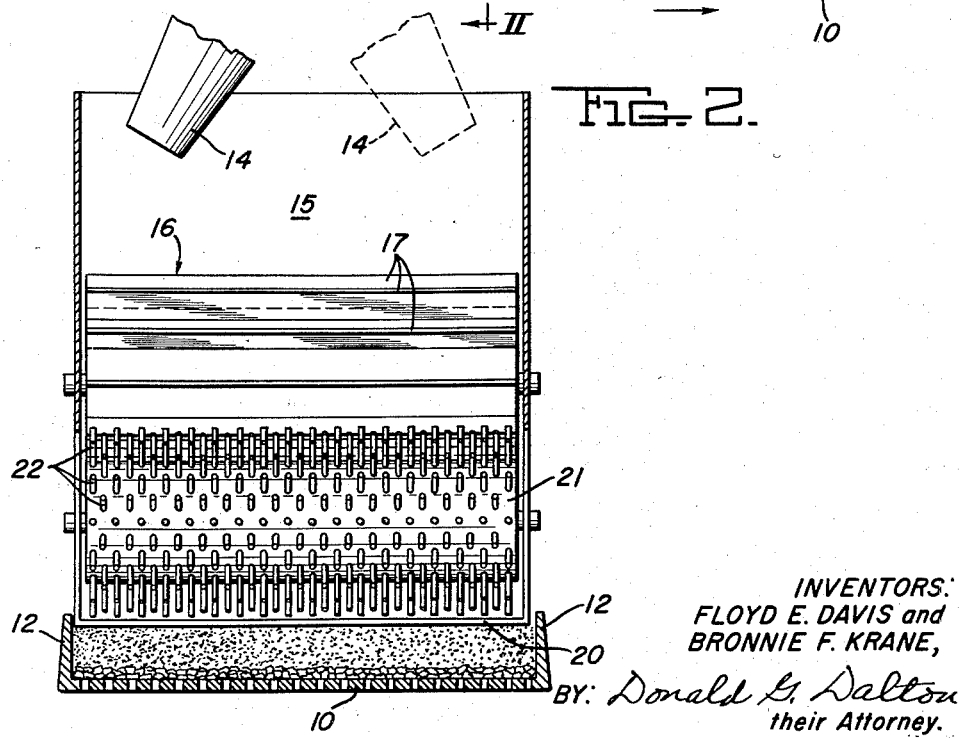

In accomplishing these and other objects of the invention, we have provided improved details of structure, a preferred form of which is shown in the accompanying drawing, in which:

Figure 1 is a somewhat diagrammatic longitudinal vertical sectional view of our improved apparatus; and Figure 2 is a diagrammatic vertical cross section on line II—II of Figure 1.

The drawing shows a portion of a traveling grate 10 and apron 12 of a conventional sintering machine. The grate moves from left to right as viewed in Figure 1 and receives the usual hearth layer from a chute 13. In accordance with our invention, a conventional swinging spout 14 feeds the main portion of the sinter mix to a hopper 15 above the grate. A feeder drum 16 is journaled in the lower portion of the hopper and carries uniformly spaced radial blades 17 extending from its circumference. The drum is driven continuously at a uniform rate clockwise as viewed in Figure 1 and thus delivers an even flow of material which is uniform across the width of the grate. A chute 18 extends downwardly from an opening 19 in the hopper below the drum 16 for receiving material from the latter. The chute terminates in a substantially horizontal lip 20 spaced above the grate 10 a distance equal to the desired bed depth. A fluffing drum 21 is journaled in the chute above this lip and carries a plurality of radial spikes 22 extending from its circumference. This drum is continuously driven counterclockwise, and its spikes continuously fluff the feed material just before deposition on the grate. Preferably a rotating bristle scraper 23 is journaled above the drum to clean off any material that tends to cling.

It is seen that our feeder drum 16 positively controls the volume of material fed to the grate to establish a layer of uniform depth thereon. Our fluffing drum 21 assures that the material is loose and porous as it is deposited. Thus our apparatus and resulting method furnish a sinter feed which burns readily to a highly porous sinter.

While we have shown and described only a single embodiment of the invention, it is apparent that modifications may arise. Therefore, we do not wish to be limited to the disclosure set forth but only by the scope of the appended claims.

We claim:

1. The combination, with a traveling grate sintering machine, of a feeding apparatus comprising a hopper above the grate adapted to receive feed material, a feeder drum journaled in the lower portion of said hopper and having uniformly spaced radial blades extending from its circumference, a chute extending downwardly from said hopper and terminating in a substantially horizontal lip spaced above the grate, and a fluffing drum journaled above said lip and having radial spikes extending from its circumference.

2. The combination, with a traveling grate sintering machine, of a feeding apparatus comprising a hopper above the grate, means for introducing feed material to said hopper, a continuously driven feeder drum journaled in the lower portion of said hopper and having uniformly spaced radial blades extending from its circumference, a chute extending downwardly from said hopper and terminating in a substantially horizontal lip spaced above the grate, a continuously driven fluffing drum journaled above said lip and having radial spikes extending from its circumference, and means for cleaning said fluffing drum of clinging material.

References Cited in the file of this patent

UNITED STATES PATENTS

| | | |
|---|---|---|
| 234,584 | Kitchens | Nov. 16, 1880 |
| 789,678 | Spear | Sept. 12, 1901 |
| 1,888,458 | Greenwalt | Nov. 22, 1932 |
| 2,110,452 | Moyer | Mar. 8, 1938 |
| 2,409,378 | Morgan | Oct. 15, 1946 |
| 2,543,150 | Burgess | Feb. 27, 1951 |

FOREIGN PATENTS

| | | |
|---|---|---|
| 867,252 | France | July 15, 1941 |
| 238,582 | Great Britain | Aug. 17, 1927 |